United States Patent
Kow et al.

(10) Patent No.: US 10,521,150 B2
(45) Date of Patent: Dec. 31, 2019

(54) DATA PROCESSING METHOD AND DEVICE FOR NONVOLATILE MEMORY AND STORAGE MEDIUM

(71) Applicant: Gowin Semiconductor Corporation, Guangzhou, Guangdong (CN)

(72) Inventors: San-Ta Kow, Guangdong (CN); Jinghui Zhu, Guangdong (CN); Diwakar Chopperla, Guangdong (CN)

(*) Notice: Subject to any disclaimer, the term of this patent is extended or adjusted under 35 U.S.C. 154(b) by 0 days.

(21) Appl. No.: 16/028,406

(22) Filed: Jul. 5, 2018

(65) Prior Publication Data
US 2019/0361624 A1 Nov. 28, 2019

(30) Foreign Application Priority Data
May 23, 2018 (CN) .......................... 2018 1 0501166

(51) Int. Cl.
*G06F 3/00* (2006.01)
*G06F 3/06* (2006.01)

(52) U.S. Cl.
CPC .......... *G06F 3/0652* (2013.01); *G06F 3/0604* (2013.01); *G06F 3/0659* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 5,603,056 A * | 2/1997 | Totani | G06F 8/65 710/8 |
| 2009/0022281 A1 | 1/2009 | Aboujaoude et al. | |
| 2009/0222816 A1 * | 9/2009 | Mansell | G06F 12/145 718/1 |

* cited by examiner

*Primary Examiner* — Francisco A Grullon
*Assistant Examiner* — Craig S Goldschmidt
(74) *Attorney, Agent, or Firm* — Andrew C. Cheng (57) ABSTRACT

The present disclosure provides a data processing method and a device for a nonvolatile memory and a storage medium. The data processing method comprises: performing a full erase operation on the nonvolatile memory if a full erase operation command is received, such that the nonvolatile memory enters an initial state, wherein the initial state refers to a state in which all operations performed on the nonvolatile memory are valid; in the initial state, storing a data if the data is written in the memory is detected, wherein the data comprises a flag information; detecting the flag information if a data readout command triggered by a user is received; and identifying that the nonvolatile memory is in a default state and prohibiting the user from reading the data stored in the nonvolatile memory if the flag information is detected as an unreadable flag information.

18 Claims, 3 Drawing Sheets

DATA PROCESSING METHOD AND DEVICE FOR NONVOLATILE MEMORY AND STORAGE MEDIUM

CROSS REFERENCE TO RELATED APPLICATIONS

The present application claims the priority of Chinese patent application No. 201810501166.X filed on May 23, 2018, the contents of which are hereby incorporated by reference.

TECHNICAL FIELD

The present disclosure relates to the technical field of data processing, in particular, to a nonvolatile memory data processing method and device, storage medium.

BACKGROUND

With the development of integrated circuits, programmable logic devices such as Field-Programmable Gate Array (FPGA) have been increasingly applied to various fields. Since the FPGA is a programmable logic device, users can design their own data stream files and store them in internal memory of the FPGA to enable the FPGA to perform the corresponding functions. For the FPGA, the internal memory thereof is generally a nonvolatile memory. The data in the nonvolatile memory is not lost after the power is turned off, which will give the criminals a chance to remove the FPGA device directly from the system board to study the way of crack and then read out the data in the FPGA.

In order to solve the above problem, the currently existing technologies mainly make the data unreadable by setting one or more security bits. However, although the above method can encrypt the data, the device is readable in a default state, that would make the criminals to find the security bit in the device through a cracking technology. On the basis of finding the security bit, as long as the security bit is damaged, the criminals make the device enter a readable state, and read the data in the device. What's more, when only one security bit is set, or the security bits are relatively centralized, it is possible to erase just the security bit by a precise positioning erasure. This makes it easy to crack the data and greatly reduce the security of data storage.

Therefore, it is necessary to provide a technical solution to solve the technical problems mentioned above.

SUMMARY

In view of this, the embodiments of the present disclosure provide a data processing method for a nonvolatile memory, the method changes the default state of the nonvolatile memory from being not encrypted to being encrypted, and prohibits criminals from reading the data in the memory in the default state, which greatly increases the difficulty of cracking and improves the security of the data storage.

A first aspect of the embodiment of the present disclosure provides a data processing method for a nonvolatile memory comprising:

performing a full erase operation on the nonvolatile memory if a full erase operation command is received, such that the nonvolatile memory enters an initial state, wherein the initial state refers to a state in which all operations performed on the nonvolatile memory are valid;

in the initial state, storing a data if the data is written in the memory is detected, wherein the data comprises a flag information and the flag information is a basis whether the data stored in the nonvolatile memory is readable or not;

detecting the flag information if a data readout command triggered by a user is received; and identifying the nonvolatile memory is in a default state and prohibiting the user from reading the data stored in the nonvolatile memory if the flag information is detected as an unreadable flag information, wherein the default state refers to the state in which the full erase operation performed on the nonvolatile memory are valid.

A second aspect of the embodiment of the present disclosure provides a data processing device for a nonvolatile memory comprising:

a full erase operation module, configured to perform a full erase operation on the nonvolatile memory if a full erase operation command is received, such that the nonvolatile memory enters an initial state, wherein the initial state refers to a state in which all operations performed on the nonvolatile memory are valid;

a storage module, configured to: in the initial state, store a data if the data is written in the memory is detected, wherein the data comprises a flag information and the flag information is a basis whether a data stored in the nonvolatile memory is readable or not;

a detection module, configured to detect the flag information if a data readout command triggered by a user is received; and a disabling module, configured to identify the nonvolatile memory is in a default state and prohibit the user from reading the data stored in the nonvolatile memory if the flag information is detected as an unreadable flag information, wherein the default state refers to the state in which the full erase operation performed on the nonvolatile memory are valid.

A third aspect of the embodiment of the present disclosure provides a data processing device for a nonvolatile memory, comprising a processor configured to:

perform a full erase operation on the nonvolatile memory if a full erase operation command is received, such that the nonvolatile memory enters an initial state, wherein the initial state refers to a state in which all operations performed on the nonvolatile memory are valid;

in the initial state, store a data if the data is written in the memory is detected, wherein the data comprises a flag information and the flag information is a basis whether a data stored in the nonvolatile memory is readable or not;

detect the flag information if a data readout command triggered by a user is received; and identify the nonvolatile memory is in a default state and prohibit the user from reading the data stored in the nonvolatile memory if the flag information is detected as an unreadable flag information, wherein the default state refers to the state in which the full erase operation performed on the nonvolatile memory are valid.

A fourth aspect of the embodiment of the present disclosure provides a data processing device for a nonvolatile memory, comprising a memory, a processor, and a computer program stored in the memory and operable on the processor, wherein the processor executes the computer program to implements the steps of the data processing method for the nonvolatile memory mentioned above.

A fifth aspect of the embodiment of the present disclosure provides a computer-readable storage medium storing a computer program, wherein the computer program, when executed by a processor, implements the steps of the data processing method for the nonvolatile memory mentioned above.

Compared with existing technologies, the beneficial effects of the embodiments of the present disclosure are that: the present disclosure performs a full erase on a nonvolatile memory to make the nonvolatile memory enter an initial state; stories a data if the data is written in the memory is detected, wherein the data comprises a flag information; detects the flag information if a data readout command is received; and identify the nonvolatile memory is in a default state and prohibits the read of the data stored in the nonvolatile memory if the flag information is detected as an unreadable flag information, thereby changing the default state of the nonvolatile memory from unencrypted to encrypted, such that the criminals are prohibited to read out the data in the memory in the default state, which greatly increases the difficulty of cracking the nonvolatile memory and improves the security of a data storage.

BRIEF DESCRIPTION OF THE DRAWINGS

In order to more clearly explain the technical solutions in the embodiments of the present disclosure, the drawings required in the description of the embodiments or the prior art will be briefly described in the follow. Obviously, the drawings in the following description are only embodiments of the present disclosure. For those of ordinary skill in the art can also obtain other drawings based on these drawings without paying any creative effort.

DETAILED DESCRIPTION

In the following description, for purpose of explanation rather than limitation, specific details such as specific system architectures and techniques are set forth in order to provide a thorough understanding of the embodiments of the present disclosure. However, it will be apparent to those skilled in the art that the present disclosure may be practiced in other embodiments without these specific details. In other instances, detailed descriptions of well-known systems, devices, circuits, and methods are omitted so as not to obscure the description of the present disclosure with unnecessary detail.

The technical solutions in the embodiments of the present disclosure will be described clearly and completely with reference to the accompanying drawings in the embodiments of the present disclosure in the follow. Apparently, the described embodiments are some but not all of the embodiments of the present disclosure. Based on the embodiments of the present disclosure, all other embodiments obtained by those of ordinary skill in the art without creative efforts shall fall within the protection scope of the present disclosure.

It should be understood that when used in this specification and the appended claims, the term "comprise", "comprising", "comprises", "include", "including", "includes" indicates the presence of stated features, integers, steps, operations, elements and/or components, but does not preclude the presence or addition of one or more further features, integers, steps, operations, elements, components, and/or their collections.

It also should be understood that the terms used in the description of the disclosure is for the purpose of describing particular embodiments only and is not intended to limit the disclosure. As used in the description of the disclosure and the appended claims, the singular forms "a," "an," and "the" are intended to include the plural forms as well, unless the context clearly indicates otherwise.

It also should be further understood that the term "and/or" used in the description of the disclosure and the appended claims refers to any combination of one or more of the associated listed items and all possible combinations and includes such combinations.

As used in the description and the appended claims, the term "if" may be interpreted as "when" or "once" or "in response to the determination" or "in response to the detecting" depending on the context. Similarly, the phrase "if determining" or "if the [condition or event described] is detected" may be interpreted to mean "once determined" or "in response to the determination" or "once detecting [a condition or event described]" or "in response to the detecting of [the condition or event described]" depending on the context.

In order to explain the technical solutions described in the present disclosure, the following description will be given through specific embodiments.

Figure 1:
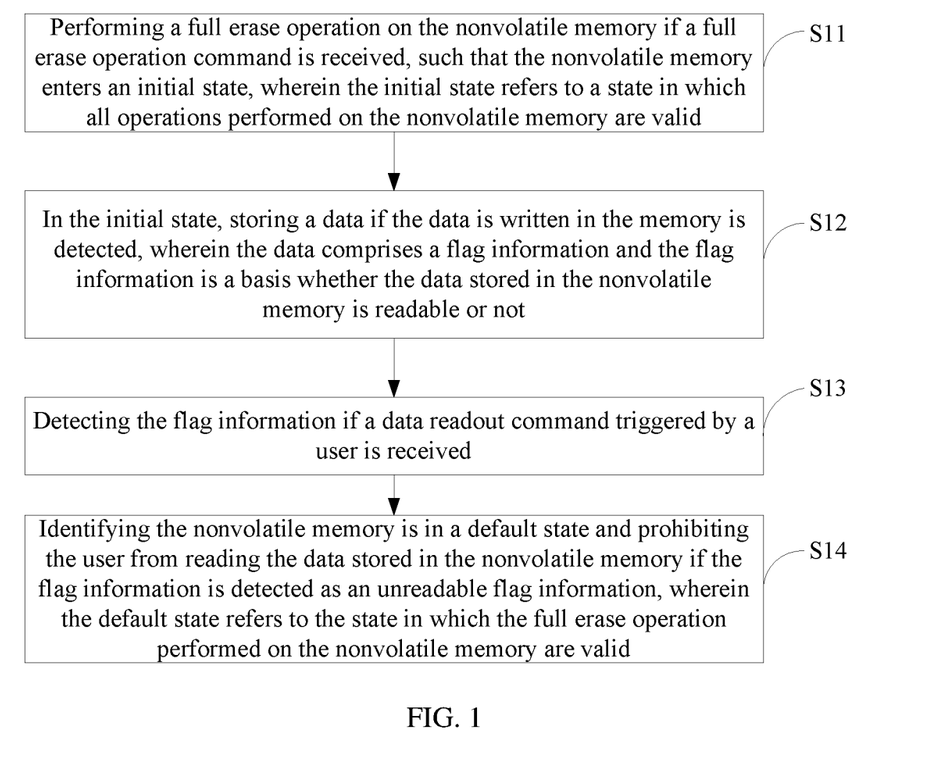
FIG. 1 is a schematic flowchart of a data processing method for a nonvolatile memory according to a first embodiment of the present disclosure.

Referring to FIG. 1, FIG. 1 is a schematic flowchart of a data processing method for a nonvolatile memory according to a first embodiment of the present disclosure. As shown in FIG. 1, the data processing method for the nonvolatile memory may comprise the steps in the follow.

At step S11, if a full erase operation command is received, a full erase operation is performed on the nonvolatile memory, such that the nonvolatile memory enters an initial state, wherein the initial state refers to a state in which all operations performed on the nonvolatile memory are valid;

Wherein, in the embodiment of the present disclosure, the full erase command refers to an operation of erasing all the data stored in the nonvolatile memory, and all operations performed on the nonvolatile memory are valid refers to the nonvolatile memory can accurately respond no matter what kind of operation is performed on the nonvolatile memory, for example, when written data or read out data, the nonvolatile memory may be performed the corresponding procedure according to the corresponding operation;

At step S12, in the initial state, if a data is written in the memory is detected, the data is stored, wherein the data comprises a flag information and the flag information is a basis whether a data stored in the nonvolatile memory is readable or not;

Wherein, in the embodiment of the present disclosure, after the nonvolatile memory enters the initial state, since the initial state is a state in which all operations performed on the nonvolatile memory are valid, if the data is written in the nonvolatile memory is detected at this time, the data is stored.

Further, since it needs to prevent the criminals from obtaining the data written in the nonvolatile memory through illegal means, when data is written in the nonvolatile memory, the data should include two parts, one part is the functional data required to be stored in the nonvolatile memory, the functional data is a programming data, a data stream file, etc. which enables a programmable logic device having the nonvolatile memory to operate according to the corresponding function, that is, the intellectual property needs to be protected by the user; and the other part is the flag information determining whether the functional data is readable or not. It should be understood that in the embodiment of the present disclosure, the functional data and the flag information are written in the nonvolatile memory together.

When the data including the function data and the flag information is written in the nonvolatile memory, the data processing device for the nonvolatile memory causes the nonvolatile memory to: when written the data, store the data according to a storage address in a corresponding data written command, and distribute the flag information and the functional data according to a specific address position during the storage process, for example, set a special encryption area in the nonvolatile memory to store the flag information and store the functional data in other positions, and the position of the encryption area is not specifically limited.

At Step S13, if a data readout command triggered by a user is received, the flag information is detected.

Wherein, in the embodiment of the present disclosure, in order to prevent the data stored in the nonvolatile memory from being obtained by criminals, when the data readout command triggered by the user is received, firstly the flag information determining whether the data stored in the nonvolatile memory may be read out or not is detected.

Specifically, detecting the flag information is mainly detecting a property of the flag information, that is, whether the flag information is a readable flag information or an unreadable flag information is detected. Understandably, in the embodiment of the present disclosure, the readable flag information refers to the flag information that the data stored in a nonvolatile memory can be read, and the unreadable flag information refers to the flag information that the data stored in the nonvolatile memory cannot be read.

At step S14, if the flag information is detected as the unreadable flag information, the nonvolatile memory is in a default state is identified, and the user is prohibited from reading the data stored in the nonvolatile memory, wherein the default state refers to the state in which the full erase operation performed on the nonvolatile memory are valid.

Wherein, in this embodiment of the present disclosure, the state in which the full erase operation performed on the nonvolatile memory is valid means that the nonvolatile memory only responds to the full erase operation, that is, the nonvolatile memory only correctly responds to the full erase operation and outputs garbled information or makes no response when other operation command is received.

When the flag information is detected as the unreadable flag information, then the processing device of the nonvolatile memory identifies that the nonvolatile memory is in the default state. Since the default state is only valid for the full erase operation, even if the data read command triggered by the user is received, the nonvolatile memory will not make a correct response to the command, thereby prohibiting the criminals from operating the nonvolatile memory, and then from reading the data stored in the nonvolatile memory.

It can be seen from the above detailed description that: compare with the existing method in which the nonvolatile memory may be operated regardless of whether the data is encrypted or not after the data is stored, the data processing method for the nonvolatile memory of the present disclosure disable the read of the data in the nonvolatile memory through the step that: when a user stores the data in a nonvolatile memory and the stored data includes the unreadable flag information, the data processing device for the nonvolatile memory determines that the nonvolatile memory is currently in the default state, and the default state is only valid for the full erase operation on the nonvolatile memory, and is invalid for the other operations, in other words, the default state is changed from "unencrypted state" to "encrypted state", thereby effectively preventing the criminals from stealing the data in the nonvolatile memory, which greatly improves the security of data storage in the nonvolatile memory.

In this embodiment, the present disclosure performs a full erase on a nonvolatile memory to make the nonvolatile memory enter an initial state; stories a data if the data is written in the memory is detected, wherein the data comprises a flag information; detects the flag information if a data readout command is received; and identify the nonvolatile memory is in a default state and prohibits the read of the data stored in the nonvolatile memory if the flag information is detected as the unreadable flag information, thereby changing the default state of the nonvolatile memory from unencrypted to encrypted, such that the criminals are prohibited from reading out the data in the memory in the default state, which greatly increases the difficulty of cracking the nonvolatile memory and improves the security of a data storage.

Figure 2:
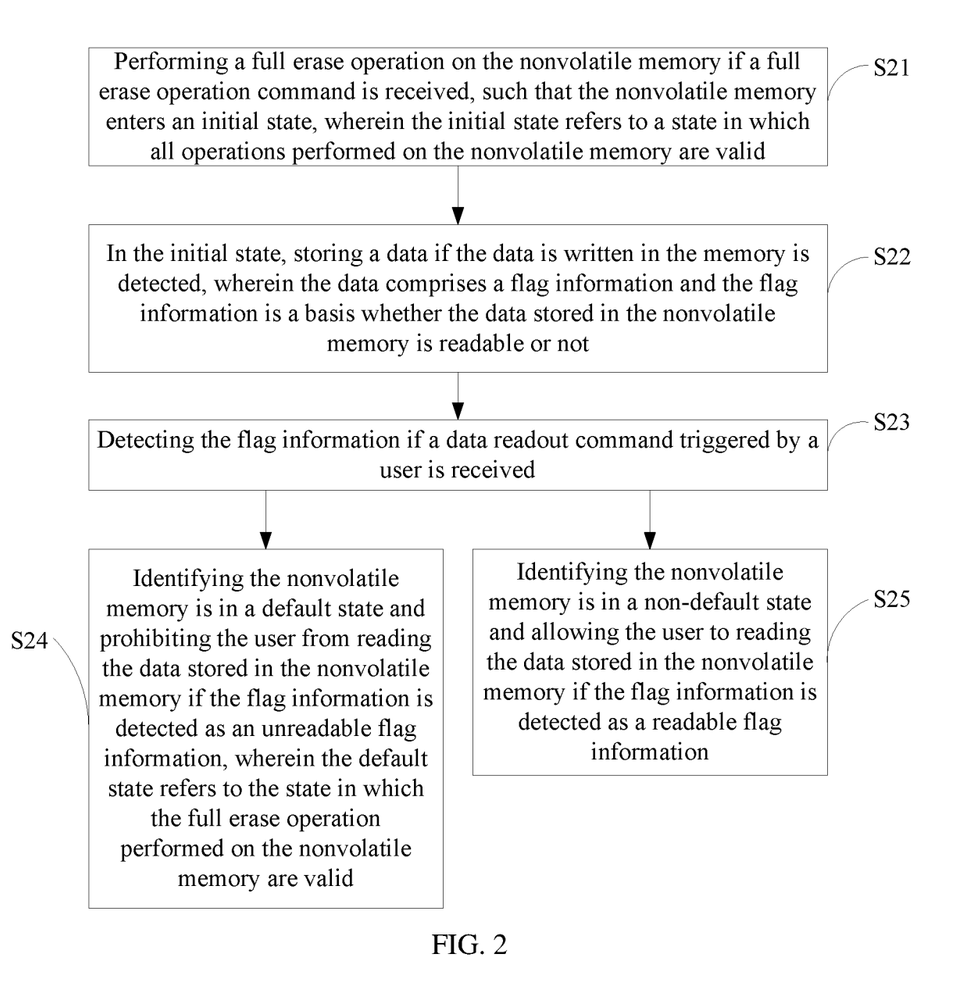
FIG. 2 is a schematic flowchart of a data processing method for a nonvolatile memory according to a second embodiment of the present disclosure.

Referring to FIG. 2, FIG. 2 is a schematic flowchart of a data processing method for a nonvolatile memory according to a second embodiment of the present disclosure. As shown in FIG. 2, the data processing method for the nonvolatile memory may comprise the steps in the follow.

At step S21, if a full erase operation command is received, a full erase operation is performed on the nonvolatile memory, such that the nonvolatile memory enters an initial state, wherein the initial state refers to a state in which all operations performed on the nonvolatile memory are valid;

Wherein, in the embodiment of the present disclosure, the full erase command refers to an operation of erasing all the data stored in the nonvolatile memory, and all operations performed on the nonvolatile memory are valid refers to the nonvolatile memory can accurately respond no matter what kind of operation is performed on the nonvolatile memory, for example, when written data or read out data, the nonvolatile memory may be performed the corresponding procedure according to the corresponding operation.

Step S22: In the initial state, if a data is written in the memory is detected, the data is stored, wherein the data comprises a flag information and the flag information is a basis whether a data stored in the nonvolatile memory is readable or not;

Wherein, in the embodiment of the present disclosure, after the nonvolatile memory enters the initial state, since the initial state is a state in which all operations performed on the nonvolatile memory are valid, if the data is written in the nonvolatile memory is detected at this time, the data is stored.

Further, since it needs to prevent the criminals from obtaining the data written in the nonvolatile memory through illegal means, when data is written in the nonvolatile memory, the data should include two parts, one part is the functional data required to be stored in the nonvolatile memory, the functional data is a programming data, a data stream file, etc. which enables a programmable logic device having the nonvolatile memory to operate according to the corresponding function, that is, the intellectual property needs to be protected by the user; the other part is the flag information determining whether the functional data is readable or not. It should be understood that in the embodiment of the present disclosure, the functional data and the flag information are written in the nonvolatile memory together.

When the data including the function data and the flag information is written in the nonvolatile memory, the data processing device for the nonvolatile memory causes the nonvolatile memory to: when written the data, store the data according to a storage address in a corresponding data written command, and distribute the flag information and the functional data according to a specific address position during the storage process, for example, set a special encryption area in the nonvolatile memory to store the flag information and store the functional data in other positions, and the position of the encryption area is not specifically limited.

At step S23, if a data readout command triggered by a user is received, the flag information is detected;

Wherein, in the embodiment of the present disclosure, in order to prevent the data stored in the nonvolatile memory from being obtained by criminals, when the data readout command triggered by the user is received, firstly the flag information determining whether the data stored in the nonvolatile memory may be read out or not is detected.

Specifically, detecting the flag information is mainly detecting a property of the flag information, that is, whether the flag information is a readable flag information or an unreadable flag information is detected. Understandably, in the embodiment of the present disclosure, the readable flag information refers to the flag information that the data stored in a nonvolatile memory can be read, and the unreadable flag information refers to the flag information that data stored in the nonvolatile memory cannot be read.

At step S24, if the flag information is detected as the unreadable flag information, the nonvolatile memory is in a default state is identified, and the user is prohibited from reading the data stored in the nonvolatile memory, wherein the default state refers to the state in which the full erase operation performed on the nonvolatile memory are valid.

Wherein, in this embodiment of the present disclosure, the state in which the full erase operation performed on the nonvolatile memory is valid means that the nonvolatile memory only responds to the full erase operation, that is, the nonvolatile memory only correctly responds to the full erase operation and outputs garbled information or makes no response when other operation command is received.

It can be known from step S23 that the flag information may be the readable flag information or the unreadable flag information, and the unreadable flag information is the flag information that the data stored in the nonvolatile memory may not be read. Therefore when the flag information is detected as the unreadable flag information, then the processing device of the nonvolatile memory identifies that the nonvolatile memory is in the default state. Since the default state is only valid for the full erase operation, even if the data read command triggered by the user is received, the nonvolatile memory will not make a correct response to the command, thereby prohibiting the criminals from operating the nonvolatile memory, and then from reading the data stored in the nonvolatile memory.

It can be seen from the above detailed description that: compare with the existing method in which the nonvolatile memory may be operated regardless of whether the data is encrypted or not after the data is stored, the data processing method for the nonvolatile memory of the present disclosure disable the read of the data in the nonvolatile memory through the step that: when a user stores the data in a nonvolatile memory and the stored data includes the unreadable flag information, the data processing device for the nonvolatile memory determines that the nonvolatile memory is currently in the default state, and the default state is only valid for the full erase operation of the nonvolatile memory, and is invalid for the other operations, in other words, the default state is changed from "unencrypted state" to "encrypted state", thereby effectively preventing the criminals from stealing the data in the nonvolatile memory, which greatly improves the security of data storage in the nonvolatile memory.

Further, as a preferred embodiment of the present disclosure, wherein the unreadable flag information refers to the data in which a first preset flag information is arranged according to a first preset combination and a first preset address position, and detecting the flag information to determine whether the flag information is the unreadable flag information comprises:

looking up the data at the first preset address position to obtain a look-up result; and if the look-up result is that the first preset flag information arranged according to the first preset combination is present at the first preset address position, indicating the flag information is the unreadable flag information; and if the look-up result is that the first preset flag information arranged according to the first preset combination is not present at the first preset address position, indicating the flag information is not the unreadable flag information.

Wherein in the embodiments of the present disclosure, the unreadable flag information refers to the data in which a first preset flag information is arranged according to a first preset combination and a first preset address position, for example 00010011001. Wherein, the "0" and the "1" included in the flag information 00010011001 are the first preset flag information, and the arrangement of the "0" and "1" in the flag information 00010011001 is the arrangement of the first preset combination, and the position of the flag information 00010011001 in the data stored in the nonvolatile memory is the first preset address position which can be set according to required requirement. It should be noted that in the embodiment of the present disclosure, the unreadable flag information is not limited to 00010011001, and the unreadable flag information may include various combinations of 0 and 1, or various combinations of other numbers, letters, etc. Furthermore, the unreadable flag information not only exists in one position in the data, but may exist in a plurality of positions, which is not specifically limited herein.

Since the unreadable flag information stored in the nonvolatile memory refers to the data in which a first preset flag information is arranged according to a first preset combination and a first preset address position, when the data processing device for the nonvolatile memory detects whether the flag information is the unreadable flag information, the data at the first preset address position firstly need to be looked up and the look-up result is obtained. After the look-up result is obtained, if the look-up result is that no data is at the first preset address position, that the flag information stored in the nonvolatile memory is not unreadable flag information is indicated; and if the look-up result is that the data is present at the address, whether the flag information is the unreadable flag information is further confirmed.

Further, when the flag information is included at the first preset address position in the data stored in the nonvolatile memory is determined, whether the flag information is the unreadable flag information may be determined by the following method. Specifically, the flag information contained in the data at the first preset address position and the arrangement of the flag information are detected, if the flag information contained in the data at the first preset address position is the first preset flag information and the arrangement of the first preset flag information is the first preset arrangement, that the flag information is the unreadable flag information is indicated; if the flag information included in the data at the first preset address position is not the first preset flag information, or the flag information contained in the data at the first preset address position is the first preset flag information, but the arrangement of the first preset flag information is not the first preset arrangement, that the flag information is not the unreadable flag information is indicated.

At step S25, if the flag information is detected as a readable flag information, the nonvolatile memory is in a non-default state is identified, and the user is allowed to read the data stored in the nonvolatile memory.

In the embodiment of the present disclosure, as known from the related description of step S23, the flag information may be the readable flag information or the unreadable flag information, and the readable flag information refers to the flag information that the data stored in the nonvolatile memory is readable, such that when the data read command triggered by the user is received, the flag information should be detected, and when the detected flag information is the readable flag information, the read of the data stored in the nonvolatile memory is allowed.

Specifically, as a preferred embodiment of the present disclosure, wherein the readable flag information refers to the data in which a second preset flag information is arranged according to a second preset combination and a second preset address position, and detecting the flag information to determine whether the flag information is the readable flag information comprises:

looking up the data at the second preset address position to obtain a look-up result; and if the look-up result is that the second preset flag information arranged according to the second preset combination is present at the second preset address position, indicating the flag information is the readable flag information; and if the look-up result is that the second preset flag information arranged according to the second preset combination is not present at the second preset address position, indicating the flag information is not the readable flag information.

Wherein, in the embodiment of the present disclosure, the specific setting of the readable flag information may refer to the specific description about the unreadable flag information at step S24, which will not be described here. In addition, the second preset flag information constituting the readable flag information may be the same as or different from the first preset flag information in the unreadable flag information; the second preset combination and the second preset address position of the second preset flag information may be the same as or different from the first preset combination and the first preset address position of the first preset flag information.

It should be noted that, in this embodiment of the present disclosure, three elements (the second preset flag information, the second preset combination and the second preset address position of the second preset flag information) constituting the readable flag information may be the same as or different from the three elements (the first preset flag information, the first preset combination and the first preset address position of the first preset flag information) constituting the unreadable flag information, but at most two elements of the three elements are the same, that is, the three elements constituting the readable flag information and the three elements constituting the unreadable flag information should not be the same at the same time.

Since the readable flag information stored in the nonvolatile memory refers to the data in which a second preset flag information is arranged according to a second preset combination and a second preset address position, when the data processing device for the nonvolatile memory detects whether the flag information is the readable flag information, the data at the second preset address position firstly need to be looked up and the look-up result is obtained. After the look-up result is obtained, if the look-up result is that no data is at the second preset address position, the flag information stored in the nonvolatile memory is not the readable flag information is indicated; if the look-up result is that the data is present at the address, whether the flag information is the readable flag information is further confirmed.

Further, when the flag information is included at the second preset address position in the data stored in the nonvolatile memory is determined, whether the flag information is the readable flag information may be determined by the following method. Specifically, the flag information contained in the data at the second preset address position and the arrangement of the flag information are detected, if the flag information contained in the data at the second preset address position is the second preset flag information and the arrangement of the second preset flag information is the second preset arrangement, the flag information is the readable flag information is indicated; if the flag information included in the data at the second preset address position is not the second preset flag information, or the flag information included in the data at the second preset address position is the second preset flag information, but the arrangement of the second preset flag information is not the second preset arrangement, the flag information is not the readable flag information is indicated.

In this embodiment, the present disclosure performs a full erase on a nonvolatile memory to make the nonvolatile memory enter an initial state; stories a data if the data is written in the memory is detected, wherein the data comprises a flag information; and detects the flag information if a data readout command is received; and identify the nonvolatile memory is in a default state and prohibits the read of the data stored in the nonvolatile memory if the flag information is detected as an unreadable flag information, thereby changing the default state of the nonvolatile memory from unencrypted to encrypted, such that the criminals are prohibited to read out the data in the memory in the default state, which greatly increases the difficulty of cracking the nonvolatile memory and improves the security of a data storage.

In addition, an external operator is allowed to read the data stored in the memory only when the flag information in the memory is the readable flag information, and the read may not be performed on the memory when the flag information is the unreadable flag information. Even writing decrypted data to the memory is performed when the flag information is the unreadable flag information, since writing a data may be completed only via many signal lines under very precise timing, therefore writing the correct unreadable flag information is almost impossible. Such make the work of cracking the nonvolatile memory change from breaking the security bit to establishing the flag information, which greatly increases the difficulty of cracking.

Figure 3:
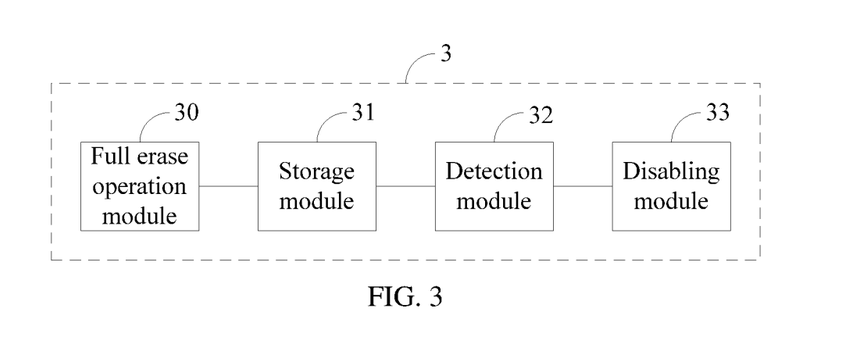
FIG. 3 is a schematic structural diagram of a data processing device for a nonvolatile memory according to a third embodiment of the present disclosure.

Referring to FIG. 3, FIG. 3 is a schematic block diagram of a data processing device 3 for a nonvolatile memory according to a third embodiment of the present disclosure. The modules included in the data processing device 3 for the nonvolatile memory provided by this embodiment of the present disclosure is configured to execute steps in the embodiment corresponding to FIG. 1, reference may be made to FIG. 1 and the related description in the embodiment corresponding to FIG. 1 for specific details which will not be repeated here. The data processing device 3 for the nonvolatile memory provided by the embodiment of the present disclosure comprises a full erase operation module 30, a storage module 31, a detection module 32, and a disabling module 33.

The full erase operation module 30 is configured to perform a full erase operation on the nonvolatile memory if a full erase operation command is received, such that the nonvolatile memory enters an initial state, wherein the initial state refers to a state in which all operations performed on the nonvolatile memory are valid.

The storage module 31 is configured to: in the initial state, store a data if the data is written in the memory is detected, wherein the data comprises a flag information and the flag information is a basis whether a data stored in the nonvolatile memory is readable or not;

The detection module 32 is configured to detect the flag information if a data readout command triggered by a user is received;

The disabling module 33 is configured to identify the nonvolatile memory is in a default state and prohibit the user from reading the data stored in the nonvolatile memory if the flag information is detected as an unreadable flag information, wherein the default state refers to the state in which the full erase operation performed on the nonvolatile memory are valid.

It should be noted that the data processing device 3 for the nonvolatile memory provided by the embodiment of the present disclosure may be disposed in the nonvolatile memory, and the nonvolatile memory may be disposed in a mobile terminal such as a programmable logic device and a mobile phone. There is no difference between the mobile terminal device, such as the programmable logic device and the mobile phone, and the existing programmable logic device and terminal device.

In this embodiment, the data processing device 3 for the nonvolatile memory of the present disclosure performs a full erase on a nonvolatile memory to make the nonvolatile memory enter an initial state; stories a data if the data is written in the memory is detected, wherein the data comprises a flag information; detects the flag information if a data readout command is received; and identifies the nonvolatile memory is in a default state and prohibits the read of the data stored in the nonvolatile memory if the flag information is detected as an unreadable flag information, thereby changing the default state of the nonvolatile memory from unencrypted to encrypted, such that the criminals are prohibited to read out the data in the memory in the default state, which greatly increases the difficulty of cracking the nonvolatile memory and improves the security of a data storage.

Figure 4:
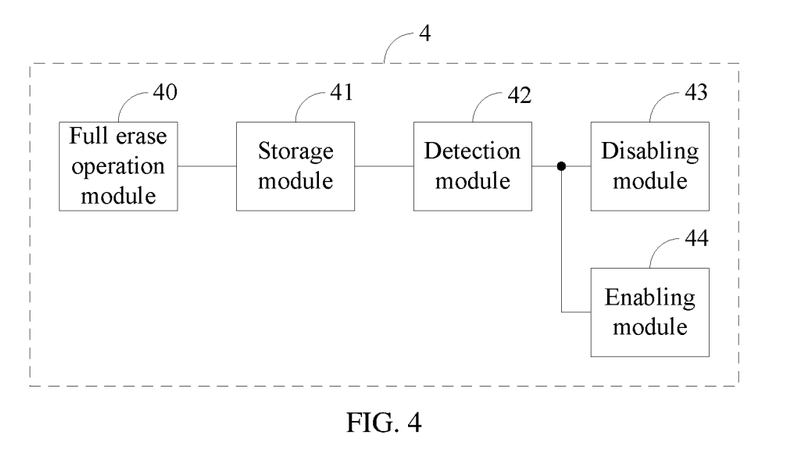
FIG. 4 is a schematic structural diagram of a data processing device for a nonvolatile memory according to a fourth embodiment of the present disclosure.

Referring to FIG. 4, FIG. 4 is a schematic block diagram of a data processing device 4 for a nonvolatile memory according to a fourth embodiment of the present disclosure. The modules included in the data processing device 4 for the nonvolatile memory provided by this embodiment of the present disclosure is configured to execute steps in the embodiment corresponding to FIG. 2, reference may be made to FIG. 2 and related description in the embodiment corresponding to FIG. 2 for specific details which will not be repeated here. The data processing device 4 for the nonvolatile memory provided by the embodiment of the present disclosure comprises a full erase operation module 40, a storage module 41, a detection module 42, a disabling module 43 and an enabling module 44.

The full erase operation module 40 is configured to perform a full erase operation on the nonvolatile memory if a full erase operation command is received, such that the nonvolatile memory enters an initial state, wherein the initial state refers to a state in which all operations performed on the nonvolatile memory are valid.

The storage module 41 is configured to: in the initial state, store the data if a data is written in the memory is detected, wherein the data comprises a flag information and the flag information is a basis whether a data stored in the nonvolatile memory is readable or not.

The detection module 42 is configured to detect the flag information if a data readout command triggered by a user is received;

The disabling module 43 is configured to identify the nonvolatile memory is in a default state and prohibit the user from reading the data stored in the nonvolatile memory if the flag information is detected as an unreadable flag information, wherein the default state refers to the state in which the full erase operation performed on the nonvolatile memory are valid.

The enabling module 44 is configured to identify the nonvolatile memory is in a non-default state and allow the user to read the data stored in the nonvolatile memory if the flag information is detected as a readable flag information.

Furthermore, the unreadable flag information refers to the data in which a first preset flag information is arranged according to a first preset combination and a first preset address position, and the detection module 42 is specifically configured to:

looking up the data at the first preset address position to obtain a look-up result; and if the look-up result is that the first preset flag information arranged according to the first preset combination is present at the first preset address position, indicating the flag information is the unreadable flag information; and if the look-up result is that the first preset flag information arranged according to the first preset combination is not present at the first preset address position, indicating the flag information is not the unreadable flag information.

Furthermore, the readable flag information refers to the data in which a second preset flag information is arranged according to a second preset combination and a second preset address position, and the detection module is specifically configured to:

looking up the data at the second preset address position to obtain a look-up result; and if the look-up result is that the second preset flag information arranged according to the second preset combination is present at the second preset address position, indicating the flag information is the readable flag information; and if the look-up result is that the second preset flag information arranged according to the second preset combination is not present at the second preset address position, indicating the flag information is not the readable flag information.

Further, the preset address position is one address position or a plurality of address positions.

It should be noted that the data processing device 4 for the nonvolatile memory provided by the embodiment of the present disclosure may be disposed in the nonvolatile memory, and the nonvolatile memory may be disposed in a mobile terminal such as a programmable logic device and a mobile phone. There is no difference between the mobile terminal device, such as the programmable logic device and the mobile phone, and the existing programmable logic device and terminal device.

In this embodiment, the data processing device 4 for the nonvolatile memory of the present disclosure performs a full erase on a nonvolatile memory to make the nonvolatile memory enter an initial state; stories a data if the data is written in the memory is detected, wherein the data comprises a flag information; detects the flag information if a data readout command is received; and identifies the nonvolatile memory is in a default state and prohibits the read of the data stored in the nonvolatile memory if the flag information is detected as an unreadable flag information, thereby changing the default state of the nonvolatile memory from unencrypted to encrypted, such that the criminals are prohibited to read out the data in the memory in the default state, which greatly increases the difficulty of cracking the nonvolatile memory and improves the security of a data storage.

In addition, the data processing device 4 for the nonvolatile memory provided of the present disclosure allows an external operator to read the data stored in the memory only when the flag information in the memory is the readable flag information, and the read may not be performed on the memory when the flag information is the unreadable flag information. Even writing decrypted data to the memory is performed, when the flag information is the unreadable flag information, since writing a data may be completed only via many signal lines under very precise timing, therefore writing the correct unreadable flag information is almost impossible. Such make the work of cracking the nonvolatile memory change from breaking the security bit to establishing the flag information, which greatly increases the difficulty of cracking.

Alternatively, in some embodiments of the present disclosure, the data processing device for a nonvolatile memory may comprises a processor configured to: perform a full erase operation on the nonvolatile memory if a full erase operation command is received, such that the nonvolatile memory enters an initial state, wherein the initial state refers to a state in which all operations performed on the nonvolatile memory are valid; in the initial state, store a data if the data is written in the memory is detected, wherein the data comprises a flag information and the flag information is a basis whether a data stored in the nonvolatile memory is readable or not; detect the flag information if a data readout command triggered by a user is received; and identify the nonvolatile memory is in a default state and prohibit the user from reading the data stored in the nonvolatile memory if the flag information is detected as an unreadable flag information, wherein the default state refers to the state in which the full erase operation performed on the nonvolatile memory are valid. Specially, the unreadable flag information refers to the data in which a first preset flag information is arranged according to a first preset combination and a first preset address position, and the processor is specifically configured to: looking up the data at the first preset address position to obtain a look-up result; and indicating the flag information is the unreadable flag information if the look-up result is the first preset flag information arranged according to the first preset combination is present at the first preset address position; and indicating the flag information is not the unreadable flag information if the look-up result is the first preset flag information arranged according to the first preset combination is not present at the first preset address position. Furthermore, in some embodiments of the present disclosure, the processor is further configured to identify the nonvolatile memory is in a non-default state and allow the user to read the data stored in the nonvolatile memory if the flag information is detected as a readable flag information.

Figure 5:
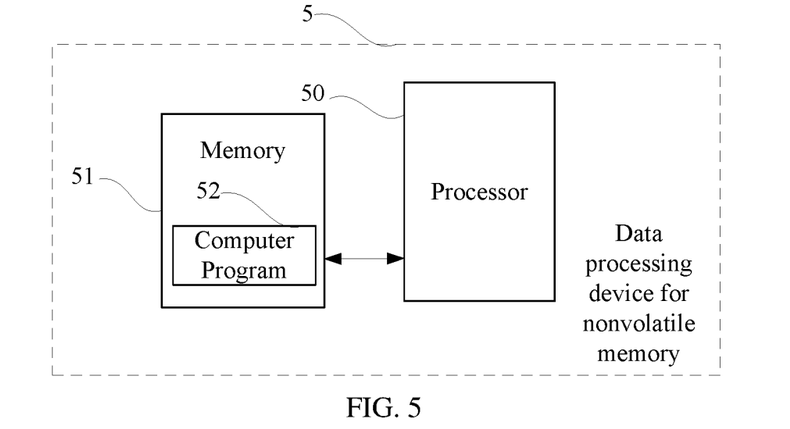
FIG. 5 is a schematic structural diagram of a data processing device for a nonvolatile memory according to a fifth embodiment of the present disclosure.

FIG. 5 is a schematic structural diagram of a data processing device 5 for a nonvolatile memory according to a fifth embodiment of the present disclosure. As shown in FIG. 5, the data processing device 5 for the nonvolatile memory of the embodiment comprises: a processor, a memory 51 and a computer program 52 stored in the memory and operable on the processor 50, for example the computer program of the data processing method for the nonvolatile memory. When the processor 50 executes the computer program 52, each of the steps of the data processing method for the nonvolatile memory in the embodiments is implemented, such as steps 11 to 14 shown in FIG. 1 or steps 21 to 25 shown in FIG. 2. Alternatively, when the processor 50 executes the computer program 52, the functions of each module/unit in each device described above in the embodiments may be realized, such as the functions of the modules 30 to 33 shown in FIG. 3 or the modules 40 to 44 shown in FIG. 4.

Exemplarily, the computer program 52 may be divided into one or more modules/units, the one or more modules/units are stored in the memory 51 and executed by the processor 50 to complete this disclosure. The one or more modules/units may be a series of computer program instruction sections capable of performing a specific function, the instruction sections is configured to describe the execution process of the computer program 52 in a surface-reducing device 5 of the three-dimensional model. For example, the computer program 52 may be divided into a full erase operation module, a storage module, a detection module, and a disabling module or divided into a full erase operation module, a storage module, a detection module, a disabling module, and an enabling module (virtual modules in the device). The specific functions of each module are described in the follow.

The full erase operation module is configured to perform a full erase operation on the nonvolatile memory if a full erase operation command is received, such that the nonvolatile memory enters an initial state, wherein the initial state refers to a state in which all operations performed on the nonvolatile memory are valid.

The storage module is configured to: in the initial state, if a data is written in the memory is detected, store the data, wherein the data comprises a flag information and the flag information is a basis whether a data stored in the nonvolatile memory is readable or not;

The detection module is configured to detect the flag information if a data readout command triggered by a user is received;

The disabling module is configured to identify the nonvolatile memory is in a default state and prohibit the user from reading the data stored in the nonvolatile memory if the flag information is detected as an unreadable flag information, wherein the default state refers to the state in which the full erase operation performed on the nonvolatile memory are valid.

Alternatively,

The full erase operation module is configured to perform a full erase operation on the nonvolatile memory if a full erase operation command is received that the nonvolatile memory enters an initial state, wherein the initial state refers to a state in which all operations performed on the nonvolatile memory are valid.

The storage module is configured to: in the initial state, if a data is written in the memory is detected, store the data, wherein the data comprises a flag information and the flag information is a basis whether a data stored in the nonvolatile memory is readable or not.

The detection module is configured to detect the flag information if a data readout command triggered by a user is received.

The disabling module is configured to identify the nonvolatile memory is in a default state and prohibit the user from reading the data stored in the nonvolatile memory if the flag information is detected as an unreadable flag information, wherein the default state refers to the state in which the full erase operation performed on the nonvolatile memory are valid.

The enabling module is configured to identify the nonvolatile memory is in a non-default state and allow the user to read the data stored in the nonvolatile memory if the flag information is detected as a readable flag information.

Furthermore, the readable flag information refers to the data in which a second preset flag information is arranged according to a second preset combination and a second preset address position, and the detection module is specifically configured to:

looking up the data at the second preset address position to obtain a look-up result; and if the look-up result is that the second preset flag information arranged according to the second preset combination is present at the second preset address position, indicating the flag information is the readable flag information; and if the look-up result is that the second preset flag information arranged according to the second preset combination is not present at the second preset address position, indicating the flag information is not the readable flag information.

Further, the preset address position is one address position or a plurality of address positions.

The data processing device 5 for the nonvolatile memory may be various processors, and may also be a surface-reduction module inside the processor. The data processing device 5 of the nonvolatile memory may comprise, but is not limited to, the processor 50 and the memory 51. Those skilled in the art can understand that FIG. 5 is merely an example of the data processing device 5 for the nonvolatile memory, does not constitute a limitation of the data processing device 5 for the nonvolatile memory, and may include more or less components than the illustration, or combine some components, or include different components, such as the data processing device 5 for the nonvolatile memory may also include input and output devices, network access devices, buses, etc.

The processor 50 may be a micro controller unit (MCU), a central processing unit (CPU), or other general-purpose processors, digital signal processor (DSP), or Application Specific Integrated Circuit (ASIC), Field-Programmable Gate Array (FPGA) or other programmable logic device, discrete gate or transistor logic device, and discrete hardware component etc. The general-purpose processor may be a microprocessor or the processor may be any conventional processor etc.

The memory 51 may be an internal storage unit of the data processing device 5 for the nonvolatile memory, such as the hard disk or memory of the data processing device 5 for the nonvolatile memory. The memory 51 may also be an external storage device of the data processing device 5 for the nonvolatile memory, such as a plug-in hard disk, a Smart Media Card (SMC), Secure Digital (SD) Card, Flash Card, and etc. equipped on the data processing device 5 for the nonvolatile memory.

Further, the memory 51 may comprise an internal memory unit of the data processing device 5 for the nonvolatile memory and also comprise an external memory device. The memory 51 is configured to store the computer program, and other programs and data required by the data processing device 5 for the nonvolatile memory. The memory 51 may also be configured to temporarily store data which has been output or will be output.

Those skilled in the art can clearly understand that, for the convenience and conciseness of the description, only the division of the above functional units and modules are used as an example for illustration. In practical applications, the above functions may be completed by different functional units and modules according to needs, that is, the internal structure of the device may be divided into different functional units or modules to complete all or some of the functions described above. Each functional unit and module in the embodiments may be integrated in one processing unit, or each unit may exist alone physically, or two or more units may be integrated in one unit. The integrated units mentioned above may be implemented in the form of hardware, and may also be implemented in the form of software. In addition, the specific names of the functional units and the modules are only for distinguishing each other and are not used to limit the protection scope of the present application. For the specific working process of the units and modules in the foregoing system, reference may be made to corresponding processes in the foregoing method embodiments, and details are not described herein again.

In the foregoing embodiments, the description of each embodiment has its own emphasis. For the part that is not described or described in detail in some embodiment, reference may be made to the relevant description of other embodiments.

Those of ordinary skill in the art may be aware that the exemplary units and algorithm steps described in conjunction with the embodiments disclosed herein can be implemented by an electronic hardware or a combination of computer software and electronic hardware. Whether these functions are implemented by the hardware or software depends on the specific application and design constraint conditions of the technical solution. The person skilled in the art may use different methods to implement the described functions for each specific application, but it should not be considered that the implementation goes beyond the scope of the present disclosure.

In the embodiments provided by the present disclosure, it should be understood that the disclosed device/terminal devices and methods may be implemented by other means. For example, the apparatus/terminal apparatus embodiments described above are merely illustrative, for example, the division of the modules or units is just a kind of logical function division. In practice, there may be another division manner, for example multiple units or components may be combined or integrated into another system, or some features may be ignored or not performed. In addition, the illustrated or discussed mutual coupling or direct coupling or communication connection may be indirect coupling or communication connection through some interfaces, devices or units, and may be electrical, mechanical or other forms.

The units described as separate parts may or may not be physically separated, and the parts displayed as units may or may not be physical units, that is, may be positioned in one place, or may be distributed on multiple network units. Some or all of the units may be selected according to actual needs to achieve the purpose of the solution of this embodiment.

In addition, each functional unit in each embodiment of the present disclosure may be integrated in one processing unit, or each unit may exist alone physically, or two or more units may be integrated in one unit. The above integrated unit may be implemented either in hardware or in software.

The integrated modules/units, if implemented in the form of software functional units and sold or used as independent products, may be stored in a computer-readable storage medium. Based on such understanding, all or part of the processes implementing the method of the above embodiments of the present disclosure, may also be implemented by a computer program instructing the relevant hardware, and the computer program may be stored in a computer-readable storage medium. When the program is executed by the processor, the steps of the foregoing method embodiments may be implemented. Wherein, the computer program includes computer program code, and the computer program code may be in the form of source code, object code, executable file or some intermediate and the like. The computer-readable medium may comprises: any entity or device capable of carrying the computer program code, a recording medium, a U disk, a removable hard disk, a magnetic disk, an optical disk, a computer memory, a Read-Only Memory (ROM), a Random Access Memory (RAM), electrical carrier signals, telecommunications signals, and software distribution media, etc. It should be noted that the contents contained in the computer-readable medium may be appropriately increased or decreased according to the requirements of legislation and patent practice in the jurisdiction, for example, in some jurisdictions, according to legislation and patent practice, the computer-readable medium excludes electrical carrier signals and telecommunication signals.

The above embodiments are only used to illustrate the technical solutions of the present disclosure, rather than limiting the same; although the present disclosure has been described in detail with reference to the foregoing embodiments, those of ordinary skill in the art should understand that the technical solutions described in the foregoing embodiments may be modified or some of the technical features may be replaced equivalently; and these modifications or replacements do not make the essence of the corresponding technical solutions deviate from the spirit and scope of the technical solutions of the embodiments of the present disclosure and should be included in the scope of the present disclosure.

What is claimed is:

1. A data processing method for a nonvolatile memory comprising:
    performing a full erase operation on the nonvolatile memory if a full erase operation command is received, such that the nonvolatile memory enters an initial state, wherein the initial state refers to a state in which all operations performed on the nonvolatile memory are valid;
    in the initial state, storing data if the data is written in the memory, wherein the data comprises functional data and a flag information and the flag information is configured to indicate whether the functional data stored in the nonvolatile memory is readable or not;
    detecting the flag information if a data readout command triggered by a user is received; and
    if the flag information indicates that the functional data is unreadable, identifying that the nonvolatile memory is in a default state and prohibiting the user from reading the functional data stored in the nonvolatile memory, wherein the default state refers to the state in which only the full erase operation performed on the nonvolatile memory is valid.

2. The data processing method according to claim 1, wherein the flag information is configured to be a first preset flag information is-arranged in a first preset address position according to a first preset combination for indicating that the functional data is unreadable, and the detecting the flag information comprises:
    looking up the data at the first preset address position to obtain a look-up result; and
    determining that the flag information indicates that the functional data is unreadable if the look-up result shows that the first preset flag information arranged according to the first preset combination is present at the first preset address position; and determining that the flag information is indicates that the functional data is readable if the look-up result shows that the first preset flag information arranged according to the first preset combination is not present at the first preset address position.

3. The data processing method according to claim 2, wherein the first preset address position is one address position or a plurality of address positions.

4. The data processing method according to claim 1, further comprising:
    if the flag information indicates that the functional data is readable, identifying that the nonvolatile memory is not in the default state and allowing the user to read the functional data stored in the nonvolatile memory.

5. The data processing method according to claim 4, wherein the flag information is configured to be a second preset flag information arranged in a second preset address position according to a second preset combination, and the detecting the flag information comprises:
    looking up the data at the second preset address position to obtain a look-up result; and
    determining that the flag information indicates that the functional data is readable if the look-up result shows that the second preset flag information arranged according to the second preset combination is present at the second preset address position; and determining that the flag information indicates that the functional data is unreadable if the look-up result shows that the second preset flag information arranged according to the second preset combination is not present at the second preset address position.

6. A data processing device for a nonvolatile memory, comprising a processor configured to:
    perform a full erase operation on the nonvolatile memory if a full erase operation command is received, such that the nonvolatile memory enters an initial state, wherein the initial state refers to a state in which all operations performed on the nonvolatile memory are valid;
    in the initial state, store data if the data is written in the memory, wherein the data comprises functional data and a flag information and the flag information is configured to indicate whether the functional data stored in the nonvolatile memory is readable or not;
    detect the flag information if a data readout command triggered by a user is received; and
    if the flag information indicates that the functional data is unreadable, identify that the nonvolatile memory is in a default state and prohibit the user from reading the functional data stored in the nonvolatile memory, wherein the default state refers to the state in which only the full erase operation performed on the nonvolatile memory valid.

7. The data processing device according to claim 6, wherein the processor is further configured to:
if the flag information indicates that the functional data is readable, identifying that the nonvolatile memory is not in the default state and allowing the user to read the functional data stored in the nonvolatile memory.

8. The data processing device according to claim 6, wherein the flag information is configured to be a first preset flag information arranged in a first preset address position according to a first preset combination for indicating that the functional data is unreadable, and the processor is specifically configured to:
looking up the data at the first preset address position to obtain a look-up result; and
determining that the flag information indicates that the functional data is unreadable if the look-up result shows that the first preset flag information arranged according to the first preset combination is present at the first preset address position; and determining that the flag information indicates that the functional data is readable if the look-up result shows that the first preset flag information arranged according to the first preset combination is not present at the first preset address position.

9. A data processing device for a nonvolatile memory, comprising a memory, a processor, and a computer program stored in the memory and operable on the processor, wherein the processor executes the computer program to implements the steps of the data processing method for the nonvolatile memory as claimed in claim 1.

10. The data processing device for a nonvolatile memory of claim 9, wherein the flag information is configured to be a first preset flag information arranged in a first preset address position according to a first preset combination for indicating that the functional data is unreadable, and wherein the processor executes the computer program to further implements the steps of:
looking up the data at the first preset address position to obtain a look-up result; and
determining that the flag information indicates that the functional data is unreadable if the look-up result shows that the first preset flag information arranged according to the first preset combination is present at the first preset address position; and determining that the flag information indicates that the functional data is readable if the look-up result shows that the first preset flag information arranged according to the first preset combination is not present at the first preset address position.

11. The data processing device for a nonvolatile memory of claim 10, wherein the first preset address position is one address position or a plurality of address positions.

12. The data processing device for a nonvolatile memory of claim 9, wherein the processor further executes the computer program to implements further the step of if the flag information indicates that the functional data is readable, identifying that the nonvolatile memory is not in the default state and allowing the user to read the functional data stored in the nonvolatile memory.

13. The data processing device for a nonvolatile memory of claim 12, wherein the flag information is configured to be a second preset flag information arranged in a second preset address position according to a second preset combination, and the processor executes the computer program to further implements the steps of:
looking up the data at the second preset address position to obtain a look-up result; and
determining that the flag information indicates that the functional data is readable if the look-up result shows that the second preset flag information arranged according to the second preset combination is present at the second preset address position; and determining that the flag information indicates that the functional data is unreadable if the look-up result shows that the second preset flag information arranged according to the second preset combination is not present at the second preset address position.

14. A computer-readable storage medium storing a computer program, wherein the computer program, when executed by a processor, implements the steps of the data processing method for the nonvolatile memory as claimed in claim 1.

15. The computer-readable storage medium storing a computer program of claim 14, wherein the flag information is configured to be a first preset flag information arranged in a first preset address position according to a first preset combination for indicating that the functional data is unreadable, and the computer program, when executed by a processor, further implements the steps of:
looking up the data at the first preset address position to obtain a look-up result; and
determining that the flag information indicates that the functional data is unreadable if the look-up result shows that the first preset flag information arranged according to the first preset combination is present at the first preset address position; and determining that the flag information indicates that the functional data is readable if the look-up result shows that the first preset flag information arranged according to the first preset combination is not present at the first preset address position.

16. The computer-readable storage medium storing a computer program of claim 15, wherein the first preset address position is one address position or a plurality of address positions.

17. The computer-readable storage medium storing a computer program of claim 14, wherein the computer program, when executed by a processor, further implements the step of if the flag information indicates that the functional data is readable, identifying that the nonvolatile memory is not in the default state and allowing the user to read the functional data stored in the nonvolatile memory.

18. The computer-readable storage medium storing a computer program of claim 17, wherein the flag information is configured to be a second preset flag information arranged in a second preset address position according to a second preset combination, and the computer program, when executed by a processor, further implements the steps of:
looking up the data at the second preset address position to obtain a look-up result; and
determining that the flag information indicates that the functional data is readable if the look-up result shows that the second preset flag information arranged according to the second preset combination is present at the second preset address position; and determining that the flag information indicates that the functional data is unreadable if the look-up result shows that the second preset flag information arranged according to the second preset combination is not present at the second preset address position.

\* \* \* \* \*